(No Model.)
H. D. TERRELL.
SPOKE AND FELLY FASTENING.
No. 409,881. Patented Aug. 27, 1889.
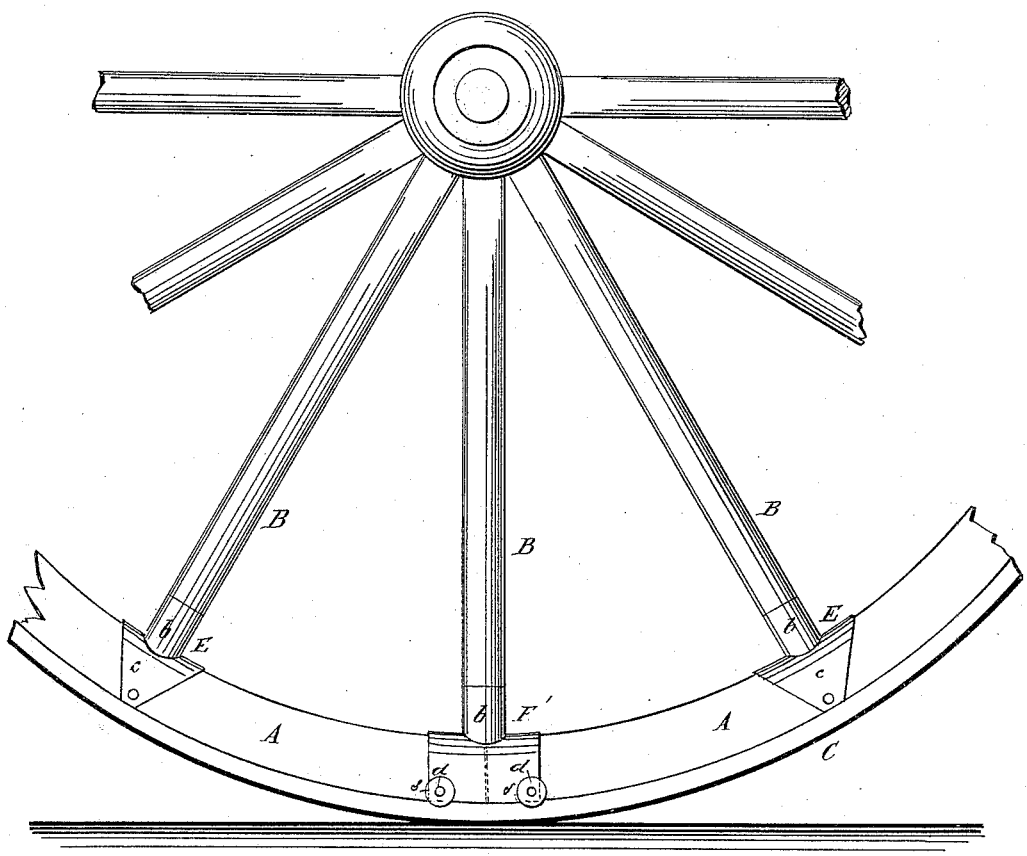
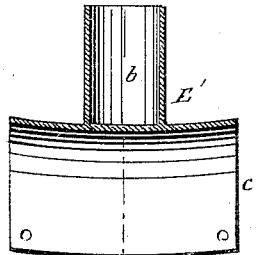
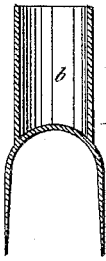
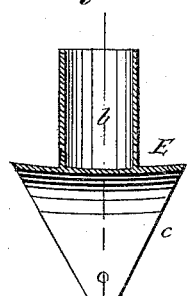
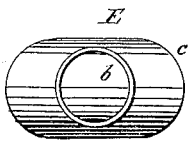
WITNESSES:
Chas. Nida
C. Sedgwick
INVENTOR
H. D. Terrell
BY Munn & Co.
ATTORNEY

United States Patent Office.

HENRY D. TERRELL, OF CONYERS, GEORGIA.

SPOKE AND FELLY FASTENING.

SPECIFICATION forming part of Letters Patent No. 409,881, dated August 27, 1889.

Application filed February 7, 1889. Serial No. 299,018. (No model.)

*To all whom it may concern:*

Be it known that I, HENRY D. TERRELL, of Conyers, in the county of Rockdale and State of Georgia, have invented a new and useful Improvement in Spoke and Felly Fastenings, of which the following is a full, clear, and exact description.

This invention relates to spoke and felly fastenings; and it consists in certain improvements in the construction of the same and the method of securing the same by means of transverse bolts or rivets having washers that extend over the edge of the tire, so as to secure the latter in position, as will be hereinafter fully described, and particularly pointed out in the claim.

Reference is to be had to the accompanying drawings, forming a part of this specification, in which similar letters of reference indicate corresponding parts in all the figures.

Figure 1 represents a side view of a vehicle-wheel in part with my invention applied; Fig. 2, a longitudinal sectional view of one of the fastenings used to connect the meeting ends of the felly together and the felly with the spokes at such parts, and Fig. 3 is a transverse section of the same. Fig. 4 is a longitudinal sectional view of one of the fastenings used to connect the spokes with the felly between the joints of the latter; Fig. 5, a transverse section of the same, and Fig. 6 an inner end view thereof.

A indicates the felly of the wheel, B B its spokes, C the tire thereof, and E E' the fastenings uniting the spokes with the felly and the felly at its joints or meeting ends together. These fastenings are made of malleable iron or drop-forgings and are slightly modified in construction, according to the portion of the wheel they are designed to be applied to—that is, the fastenings E and E' are of a modified construction to adapt them to the parts of the wheel they are applied to. They both, however, are of similar construction in various essential features. Thus they are both constructed with a socket or ferrule portion $b$ at their backs flush with the bodies of the spokes and adapted to receive the outer tenon ends of the spokes, which do not enter the felly to weaken it, and they are both made with outer opposite side flange portions or heads $c$, of rounded form at their base to closely hug the inner rounded surface of the felly, and with their sides extending out to or near to the outer edges of the felly to firmly grip the latter. These flange or head portions $c$, too, are made of a length to take in a long portion of the felly, especially the heads of the fastenings E', which connect the meeting ends of the felly-sections, closing the joints there formed, the other fastenings E, which only serve to unite the spokes with the felly between the joints in the latter, preferably being of tapering or diminishing width toward the outer ends of their side flanges, thus giving greatest strength where most strength is needed, and this may be further augmented in both sets of fastenings by making the metal of which they are composed thicker at the bottom or inner portions of the side flanges. Such fastenings cannot bend or give way, and present a neat or feathering finish.

The fastenings E' have their flange-heads $c$ made of like length, or thereabout, throughout the depth, and are of an extended length to take in a large portion of each felly-section at the joints in the felly, and so that the meeting ends of the felly-sections come directly over a spoke. These flange-head portions $c$ of the fastenings E' are, as their length provides for, firmly secured to the felly-sections on both sides of the joint by rivets $d\ d$, while a single rivet $d$, near the outer or tapering ends of the flange-head portions of the fastenings E, will serve to secure said fastenings to their places.

The rivets are provided with washers $s\ s$, that extend or lap over the sides of the tire, so as to hold the tire in place, and whereby separate bolts passing through the tire and felly can be dispensed with.

Having thus described my invention, what I claim as new, and desire to secure by Letters Patent, is—

A spoke-socket comprising a curved head or plate adapted to embrace the felly and forming the bottom of a socket extending from the convex side of said curved head and adapted to receive the end of a spoke, in combination with bolts or rivets passing transversely through the felly and through said head or plate, and washers extending over the edge of the tire, substantially as set forth.

HENRY D. TERRELL.

Witnesses:
C. V. SANFORD,
J. C. STEPHENSON.